US008661049B2

(12) United States Patent
Will et al.

(10) Patent No.: US 8,661,049 B2
(45) Date of Patent: Feb. 25, 2014

(54) WEIGHT-BASED STEMMING FOR IMPROVING SEARCH QUALITY

(75) Inventors: Stefan Will, Raleigh, NC (US); Pierre C. Grenier, San Francisco, CA (US)

(73) Assignee: Zendesk, Inc., San Francisco, CA (US)

( * ) Notice: Subject to any disclaimer, the term of this patent is extended or adjusted under 35 U.S.C. 154(b) by 0 days.

(21) Appl. No.: 13/544,890

(22) Filed: Jul. 9, 2012

(65) Prior Publication Data
US 2014/0012841 A1 Jan. 9, 2014

(51) Int. Cl.
G06F 17/30 (2006.01)
(52) U.S. Cl.
USPC ........... 707/759; 707/706; 707/707; 707/722; 707/723; 707/748; 707/752; 707/765; 707/766; 707/769; 709/201; 709/203; 709/213; 709/217
(58) Field of Classification Search
USPC ......... 707/706–707, 722–723, 748, 752, 759, 707/765–766, 769; 709/201, 203, 213, 217
See application file for complete search history.

(56) References Cited

U.S. PATENT DOCUMENTS

| 5,317,507 | A | 5/1994 | Gallant |
| 5,325,298 | A | 6/1994 | Gallant |
| 6,470,307 | B1 | 10/2002 | Turney |
| 7,089,234 | B2* | 8/2006 | Dugan et al. ................... 707/716 |
| 7,171,351 | B2* | 1/2007 | Zhou ................................. 704/9 |
| 7,194,455 | B2* | 3/2007 | Zhou et al. ........................... 1/1 |
| 7,383,282 | B2 | 6/2008 | Whitehead et al. |
| 7,418,444 | B2 | 8/2008 | Flank et al. |
| 7,668,887 | B2 | 2/2010 | Vella |
| 7,739,276 | B2* | 6/2010 | Lee et al. ....................... 707/723 |
| 7,788,276 | B2 | 8/2010 | Peng et al. |
| 7,882,124 | B2* | 2/2011 | Slaney et al. .................. 707/765 |
| 7,885,918 | B2 | 2/2011 | Statchuk |
| 7,974,963 | B2* | 7/2011 | Zhou et al. ..................... 707/706 |
| 8,180,628 | B2* | 5/2012 | Feng et al. ......................... 704/9 |
| 2003/0020749 | A1 | 1/2003 | Abu-Hakima et al. |
| 2004/0024759 | A1* | 2/2004 | Dugan et al. ....................... 707/4 |
| 2004/0059564 | A1* | 3/2004 | Zhou ................................. 704/4 |
| 2004/0059718 | A1* | 3/2004 | Zhou et al. ......................... 707/3 |
| 2005/0149499 | A1 | 7/2005 | Franz et al. |
| 2005/0273318 | A1* | 12/2005 | Zhou et al. ...................... 704/10 |

(Continued)

OTHER PUBLICATIONS

Crouch, Carolyn J., et al., "Improving the retrieval effectiveness of very short queries," Information Processing and Management 38 (2002) 1-36.

(Continued)

*Primary Examiner* — Frantz Coby
(74) *Attorney, Agent, or Firm* — Baker & Hostetler LLP

(57) ABSTRACT

A technique including receiving a search query; identifying a first original query term based on the query; identifying a first expanded query term related to the first original query term; determining a first lexical distance between the first original query term and the first expanded query term; determining a first weight for the first expanded query term based on the determined first lexical distance; identifying a plurality of documents, from among a corpus of documents, as each relevant to the search query, the plurality of documents including a first document identified based on its inclusion of the first expanded query term; ranking the plurality of documents, with the ranking of the first document being based upon the calculated first weight; and generating a response to the search query identifying two or more of the plurality of documents, ordered according to the ranking.

20 Claims, 4 Drawing Sheets

(56) References Cited

U.S. PATENT DOCUMENTS

| | | |
|---|---|---|
| 2006/0271546 A1 | 11/2006 | Phung |
| 2008/0275874 A1 | 11/2008 | Goyal |
| 2008/0313202 A1 | 12/2008 | Kamen |
| 2009/0012778 A1* | 1/2009 | Feng et al. .................... 704/9 |
| 2009/0144249 A1 | 6/2009 | Jung |
| 2009/0164456 A1* | 6/2009 | Slaney et al. .................. 707/5 |
| 2009/0198684 A1 | 8/2009 | Collins et al. |
| 2009/0222409 A1* | 9/2009 | Peoples et al. ................ 707/3 |
| 2009/0234832 A1 | 9/2009 | Gao et al. |
| 2009/0248662 A1* | 10/2009 | Murdock ........................ 707/5 |
| 2010/0070506 A1 | 3/2010 | Whang et al. |
| 2010/0082333 A1 | 4/2010 | Al-Shammari |
| 2010/0228742 A1* | 9/2010 | Vandelle et al. .............. 707/750 |
| 2011/0004618 A1 | 1/2011 | Chaudhary |
| 2011/0184720 A1 | 7/2011 | Zangvil |
| 2012/0047159 A1 | 2/2012 | Pickens et al. |
| 2012/0310928 A1* | 12/2012 | Ray et al. ..................... 707/728 |

OTHER PUBLICATIONS

Arslan, Ahmet, et al., "An Approach to Prevent Stemming Side Effects in Information Retrieval".

* cited by examiner

WEIGHT-BASED STEMMING FOR IMPROVING SEARCH QUALITY

FIELD OF THE INVENTION

The present invention relates generally to electronic information search and retrieval. More specifically, systems and methods are disclosed for improving search quality.

BACKGROUND

In a simple information retrieval system, a user typically enters a query comprising one or more query terms and receives a list of documents containing the query terms. Documents that do not contain the query terms are ignored. However, "recall," or the fraction of the documents that are relevant to the query that are successfully retrieved, is low for this simple information retrieval system. As a result, documents which may be of interest to the user may not be identified in response to the query, and thus never presented to the user.

One technique used to increase recall is known as "stemming," which involves stripping out pre-fixes or post-fixes to a word. Such pre-fixes and post-fixes are common in the English language, and are seen in other languages. Conventionally, stemming is typically applied when indexing a body of documents. For example, an occurrence of the word "tickets" in a document would be indexed as "ticket." When a query is provided to the search engine, stemming of the query terms (also known as "term reduction") is performed—the same kind of transformation performed during indexing—and the index is accessed using the stemmed query terms. As an example, a search for "ticketing" on a search engine employing stemming would return documents containing the word "ticket" (the stem of "ticketing") and documents containing the word "tickets" (which has the same stem, "ticket," as "ticketing").

Another technique used to increase recall is known as "query expansion," in which one or more query terms are supplemented with additional related query terms. One known technique for identifying related terms is analyzing the co-occurrence of terms or co-occurrence with similar terms observed in documents during indexing and query terms submitted in previous search queries (typically obtained by processing query logs) to produce a thesaurus of semantically related terms. Such a technique may, for example, determine that "plane" and "aircraft" are related, that "hospital" and "medical" are related. In such an example, a search query including the term "hospital" may be expanded to also include the term "medical." In some cases, a weighting may be applied to an added term based on the observed pairwise degree of co-occurrence between the original term and the expanded term. Such weighting signals to a result ranking process where a document is retrieved based on an expanded term with a low degree of co-occurrence, it should be ranked lower among the retrieved documents.

Although stemming and query expansion each generally increase recall, they also generally result in reduced "precision," or the fraction of the documents retrieved that are relevant to the query. As a result, a search may result in many documents which are not of interest to a user in response to a query. There is a need to improve search results by increasing recall while avoiding this loss of precision and/or improve the ranking of the search results.

SUMMARY

The above need for increased precision is particularly felt in the context of customer support system, in which support tickets are generated by users and support staff to describe and track various support issues. However, the nature of the information stored in such support tickets generally results in a steep decline in precision when seeking to improve recall by employing conventional stemming or query expansion techniques. In many customer support systems, there is a high volume of support tickets, and these support tickets usually are focused in a specific body of knowledge in which it may be common to have minor variations on terms. This application describes techniques which counteract the loss of precision generally seen in the context of customer support tickets. However, these techniques are also more generally applicable to, and likely to improve precision of, searches performed against other types of documents. Additionally, in some embodiments, a standing indexing engine may be used without post-processing of the resulting index.

An aspect of the disclosed subject matter includes a computer-implemented method comprising receiving a search query; identifying a first original query term based on the query; identifying a first expanded query term related to the first original query term; determining a first lexical distance between the first original query term and the first expanded query term; determining a first weight for the first expanded query term based on the determined first lexical distance; identifying a plurality of documents, from among a corpus of documents, as each relevant to the search query, the plurality of documents including a first document identified based on its inclusion of the first expanded query term; ranking the plurality of documents, with the ranking of the first document being based upon the calculated first weight; and generating a response to the search query identifying two or more of the plurality of documents, ordered according to the ranking.

Another aspect includes a search system comprising a query expansion engine programmed to receive a search query; identify a first original query term based on the query; identify a first expanded query term related to the first original query term; determine a first lexical distance between the first original query term and the first expanded query term; and determine a first weight for the first expanded query term based on the determined first lexical distance; a search system programmed to identify a plurality of documents, from among a corpus of documents, as each relevant to the search query, the plurality of documents including a first document identified based on its inclusion of the first expanded query term; and a ranking engine programmed to rank the plurality of documents, with the ranking of the first document being based upon the calculated first weight, wherein the search system is further programmed to generate a response to the search query identifying two or more of the plurality of documents, ordered according to the ranking.

DETAILED DESCRIPTION

Figure 1:
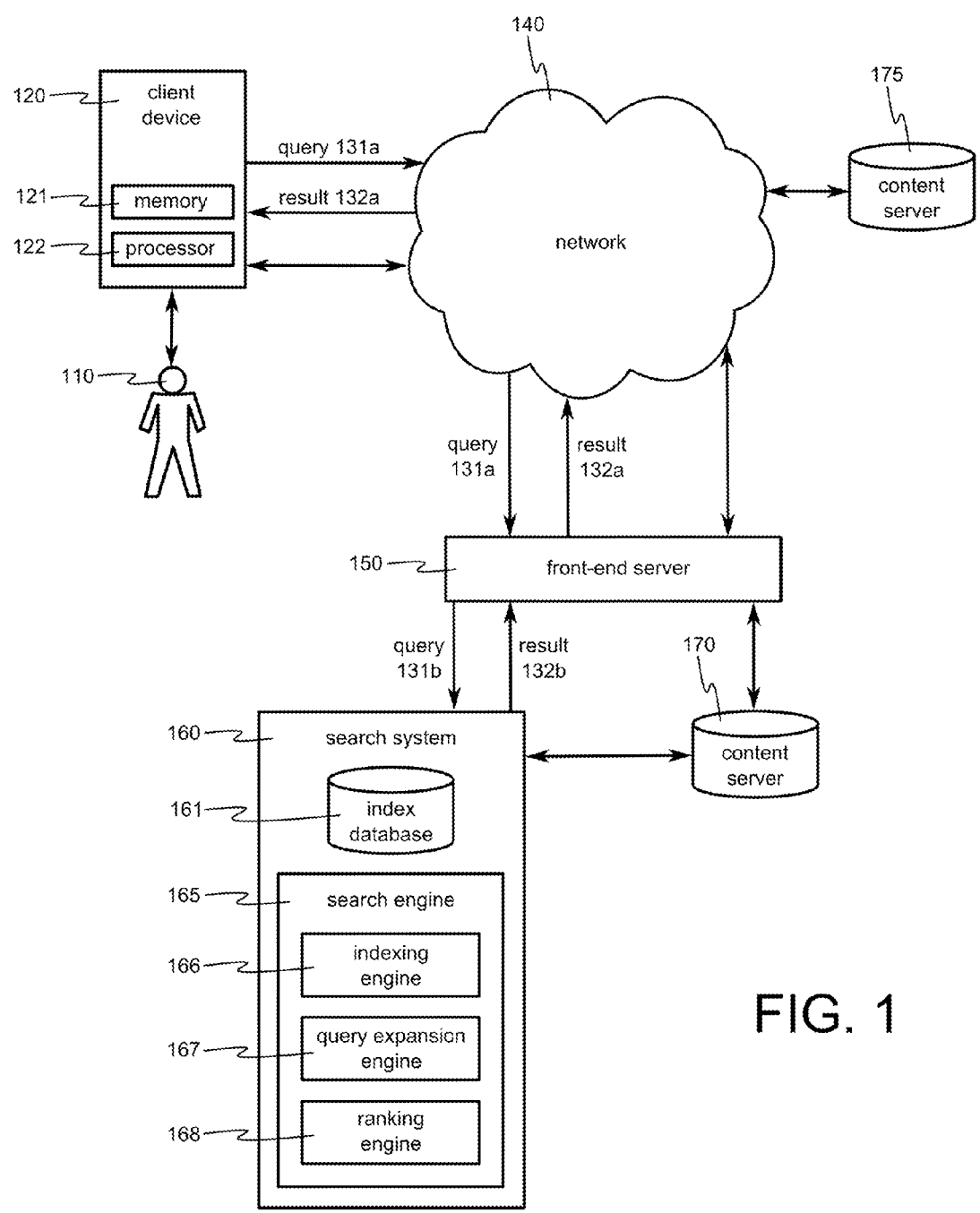
FIG. 1 is a block diagram illustrating an example search system.
Figure 3:
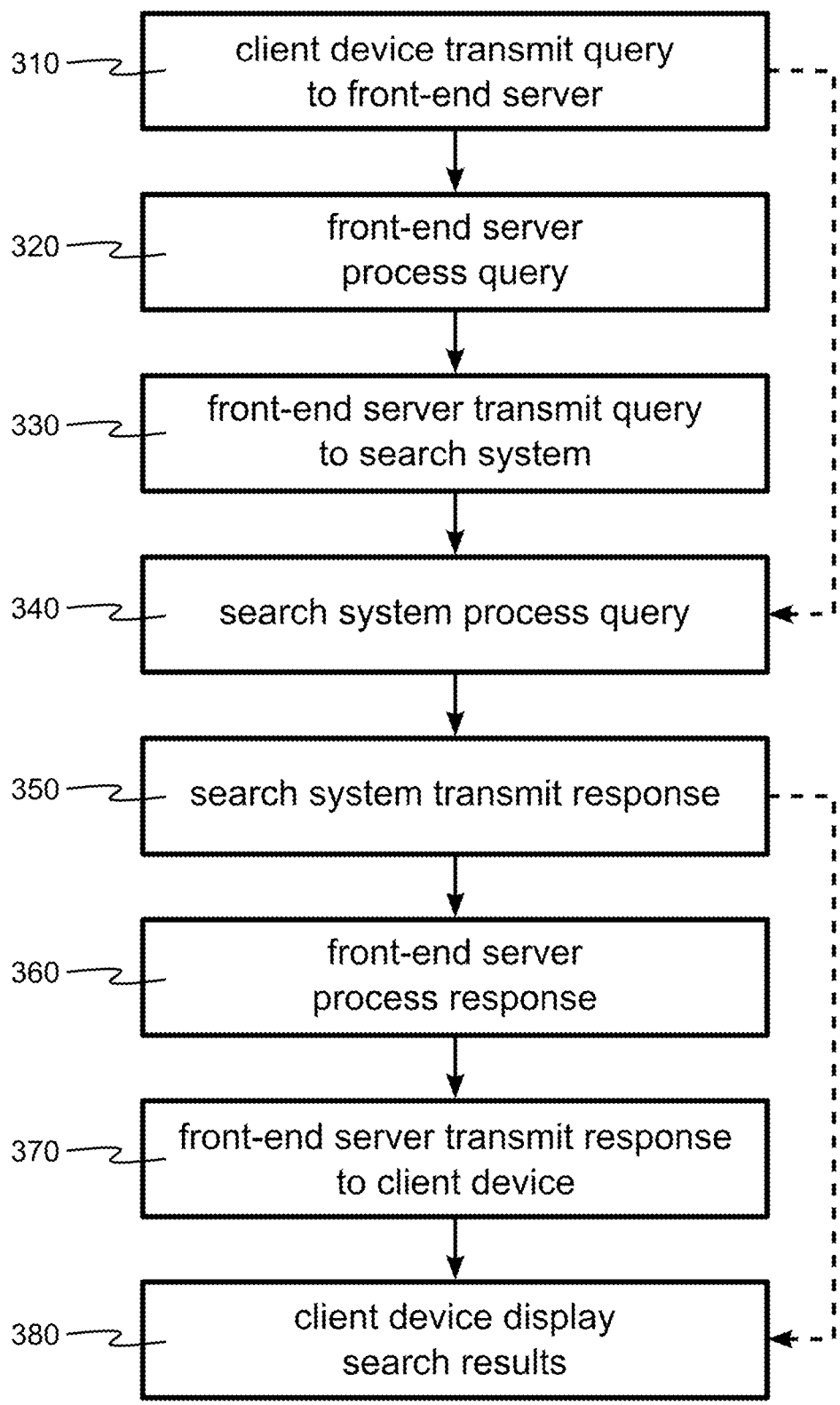
FIG. 3 illustrates a method of performing a search query.
Figure 4:
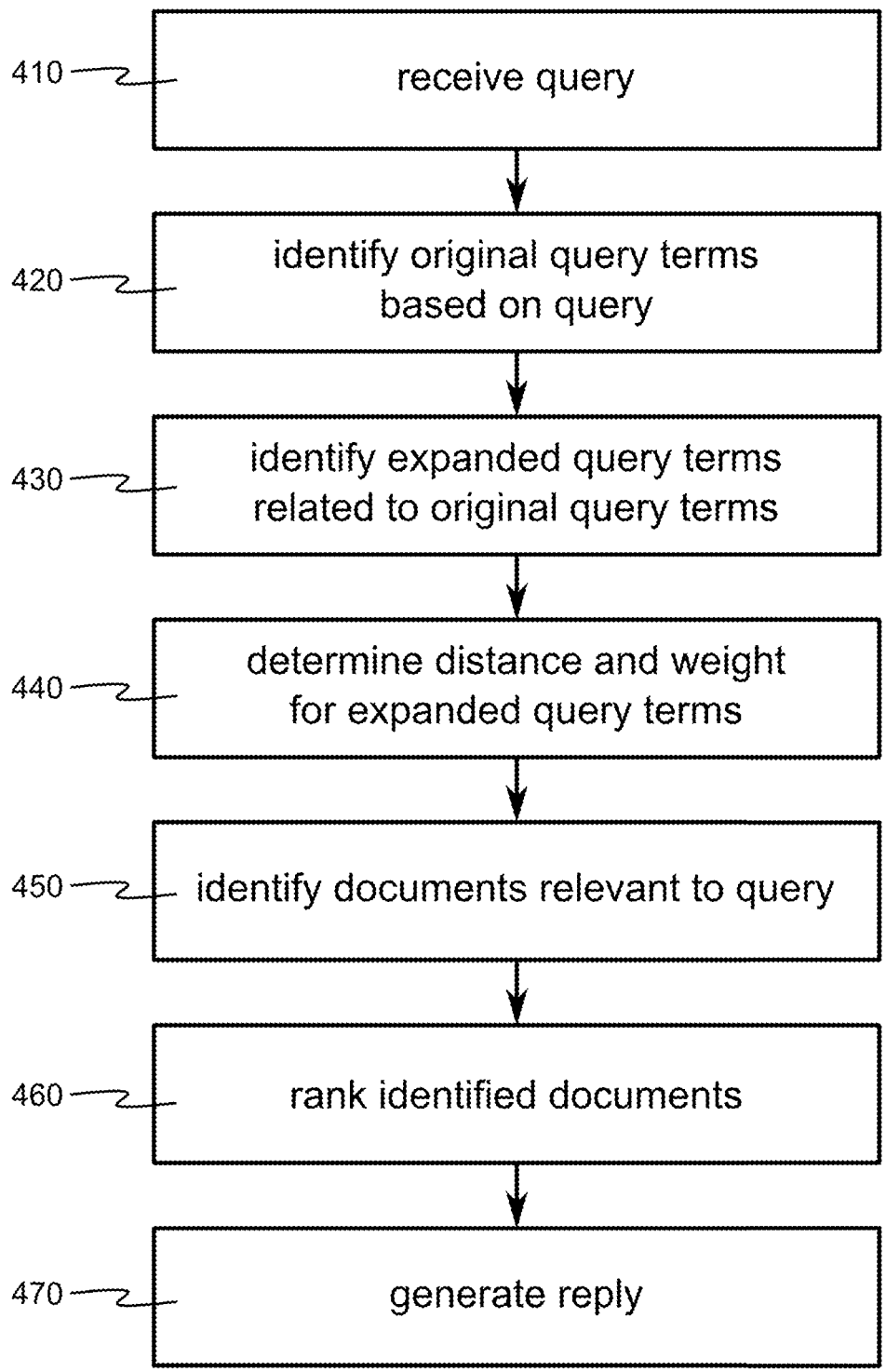
FIG. 4 illustrates a method for a search system to process a received search query.

FIG. 1 is a block diagram of, and FIGS. 3 and 4 illustrate methods for, an example search system 160 that can be used to provide search results relevant to submitted queries as can be implemented in an Internet, an intranet, or another client and server environment. The search system 160 is an example of an information retrieval system in which the systems, components, and techniques described below can be implemented. However, those skilled in the art will appreciate that many variations upon the disclosed system are also effective for implementing the inventive aspects of this disclosure.

A user 110 can interact with the search system 160 through a client device 120. For example, the client 120 can be a computer coupled to the search system 160 through a local area network (LAN) or wide area network (WAN), e.g., the Internet. Examples of such a computer include, but are not limited to, a desktop computer, a laptop or notebook computer, a tablet computer, and a smartphone or other mobile telecommunication device. In some implementations, the search system 160 and the client device 120 can be one machine. For example, a user can install a desktop search application on the client device 120. The client device 120 will generally include a random access memory (RAM) 121 and a processor 122.

In step 310, a user 110 can submit a query 131*a* to the search system 160 found behind front-end server 150. For example, user 110 may use a web browser application executing on client device 120 to generate an HTTP-formatted query 131*a*. When the user 110 submits a query 131*a*, the query 131*a* is transmitted through a network 140, then to front-end server 150. In response to receiving query 131*a*, front-end server 150 issues query 131*b* to search system 160. In some embodiments, query 131*a* will simply be relayed or repeated as query 131*b*, without significant modification of the content of query 131*a*. In some embodiments, in step 320, front-end server 150 will perform additional processing in response to query 131*a* in order to generate query 131*b*. For example, query terms might be added in query 131*b* to narrow a search requested by user 110 via query 131*a*. Thus, in step 330, front-end server 150 transmits query 131*b* to search system 160. In addition to handling a query 131*a*, front-end server 150 may be configured to provide other information services. For example, front-end server 150 may be configured to execute a web server or web application engine to provide network-based services via network 140, including providing access to documents or other information stored and made available by content server 170. One specific network-based service includes a network-based customer support system accessible to user 110 via a web browser application executing on client device 120. In an embodiment, query 131*a* may be transmitted directly from client device 120 to search system 160, without an intermediate front end server 150, as illustrated by the upper dashed line in FIG. 3. In such an embodiment, search system 160 would directly reply to client device 120, as illustrated by the lower dashed line in FIG. 3

The search system 160 can be implemented as, for example, one or more computer programs running on one or more computers in one or more locations that are coupled to each other through a network. The search system 160 includes an index database 161 and a search engine 165. The search system 160 responds to the query 131*b* by generating search result 132*b*, which in step 350 is transmitted to front-end server 150. As with query 131*a*, front-end server 150 may simply pass result 132*b* through as result 132*a*, or in response to receiving result 132*b*, in step 360 front-end server 150 may perform additional processing in order to generate result 132*a*. In step 370, result 132*a* is transmitted through the network 140 to the client device 120. In an embodiment, result 132*a* is in a form that can be presented to the user 110, such as an HTML-formatted search results web page to be displayed in step 380 in a web browser session executing on the client device 120.

In step 340, when the query 131*b* is received by the search system 160, the search engine 165 processes query 131*b* and identifies documents that match or are otherwise responsive to the query 131*b*. "Documents" are understood here to be any form of indexable content, including, but not limited to, textual information in any text or graphics format, images, video, audio, multimedia, presentations, and web pages (which can include embedded hyperlinks and other metadata, and/or programs, for example, in Javascript). The search engine 165 will generally include, or have access to, an indexing engine 166 that indexes a corpus of documents and stores indexing information in index database 161. Search engine 165 utilizes the index database 161 to identify documents responsive to query 131*a*. The corpus of documents indexed by the indexing engine 166 may be accessible via content server 170, which is also behind front-end server 150 (in other words, not generally accessible directly from network 140), or may be accessible via one or more content servers 175 accessible to indexing engine 166 and client device 120 via network 140. Indexing may be performed based on features including, but not limited to, the content of a document, information automatically generated from a document (such as, but not limited to, information generated by optical character recognition or machine vision techniques applied to images or videos), a "tag" assigned by a user or administrator to describe or characterize a document, and document metadata.

Typically, search engine 165 will identify more than one document as responsive to query 131*a*, and the end result 132*b* will identify more than one document. Typically, where there are multiple documents identified in result 132*b*, the documents will be presented in result 132*b* in an explicit order or "ranking," generally according to a level of relevance associated with the documents. To do this, the search engine 165 will generally include a ranking engine 168 that ranks documents that are determined by search engine 165 to be responsive to the query 131*b*, such that, for example, result 132*b* may present the most relevant documents first. Many techniques for ranking are known in the art. The search system 160 can transmit the result 132*b* to client device 120 through front-end server 150 and network 140 for presentation to the user 110. In some embodiments, front-end server 150 may manipulate the result 132*b* received from search system 160 in order to present them to user 110 in a format consistent with other information services provided by front-end server 150. For example, result 132*b* might be a simple XML-based listing of document identifiers for information available via content server 170, and front-end server 150 is configured to convert these document identifiers into Uniform Resource Identifiers (URIs) included in result 132*a* which client device 120 can use to access documents identified result 132*b*.

In step 410, search system 160 receives query 131*b*. In step 420, search engine 165 identifies one or more original query terms based on query 131*b*. A query term specifies one or more sequences of characters (usually words), which may also specify patterns or regular expressions (for example, the query term "cat*" might positively match with "cat" and "catch"). For example, query 131*b* might be an HTTP GET message including the URI "http://server/search?q=concert+ticket", from which search engine 165 identifies set of two original query terms: "concert" and "ticket." In some embodiments, query 131*b* may indicate various operators, modifiers, and/or parameters to be used in connection with or in addition to query terms. For example, query 131*b* might be an HTTP GET message including the URI "http://server/search?q=concert+ticket&max_create_days=7", from which search engine 165 identifies the above-mentioned set of two original query terms: "concert" and "ticket," and further limits responsive documents to those created in the last 7 days (in other words, it will exclude otherwise relevant documents that were created more than 7 days ago). The above HTTP GET messages are merely illustrations, and other message formats may be used.

Search engine 165 includes query expansion engine 167, which is configured to, in step 420, identify zero or more expanded query terms related to the original query terms. For example, query expansion engine 167 may be configured to, for each original query term, identify zero or more related expanded query terms. For some original query terms, query expansion engine 167 might not identify any expended query terms. Generally, the expanded query terms are used in addition to the original query terms. However, in some embodiments there may be situations in which one or more original query terms will be replaced in favor of expanded query terms identified by query expansion engine 167.

One technique for identifying an expanded query term related to an original query term involves identifying words that have a stem in common with the original query term. For example, in connection to the original query term "tickets," having the stem "ticket," query expansion engine 167 would identify "ticket," "ticketed," and "ticketing" as expanded terms, as each has the same stem "ticket" as the original term. It is noted that although in the English language a given word will usually have only one stem, there are situations, including in non-English languages, in which a term will have multiple stems. Query expansion engine 167 may be configured to identify expanded terms corresponding to all stems identified for a term. In an embodiment, this identification of related words according to stems is implemented by a dictionary of words that are indexed according to their stem(s). For example, the dictionary entries for "ticket," "ticketed," "ticketing," and "tickets" would each be indexed under the stem "ticket." With this embodiment, query expansion engine 167 would determine the stem of "tickets" (which may be performed by a dictionary lookup), and perform a lookup on the dictionary using the stem as an index. In another embodiment, each word in a dictionary is associated with other words in the dictionary having a common stem. For example, the dictionary entry for "tickets" would be directly linked to the words "ticket," "ticketed," "ticketing," and "tickets". With this embodiment, query expansion engine 167 does not need to determine a stem for the original query term "tickets" before accessing the dictionary. In some embodiments, such dictionaries can be, in part or in whole, automatically generated based on document processing by indexing engine 166. Many other techniques for identifying words that have a stem in common with an original query term are within the skill of the art. Stemming techniques useful for the English language include, but are not limited to, Snowball-based stemmers and the Porter stemming algorithm.

In an embodiment, a standard indexing engine, such as the one provided in the Lucene search engine, is used to generate an index and a corresponding dictionary of indexed terms, where the dictionary is sorted in alphabetical order. This dictionary can be used to identify candidate expansions by identifying terms in the dictionary which begin with the same n letters as an original query term, such as the first 3 letters. For example, from the original query term "tickets," such candidate expansions might include "tic," "tick," "ticket," "ticketed," "ticketing," "tickled," "ticklish," "ticktack," "ticktock," "tics," and "tictac." Then, stemming is performed on each of the candidate expansions to identify expansions having a stem in common with the original query term.

As discussed previously, there is a conventional technique in connection with stemming in which indexing of a document includes identifying a stem for a word included in the document and indexing the document in a document index by the identified stem, and query terms are stemmed (in other words, a query term is reduced to its stem) and documents are identified from the document index based on the stemmed query terms. As previously described as an example, a search for "ticketing" on a search engine employing this conventional technique would return documents containing the word "ticket" (the stem of "ticketing") and documents containing the word "tickets" and/or "ticketless" (which each have the same stem, "ticket," as "ticketing"). However, as noted previously, this technique for indexing and searching results in reduced precision, as there may a significant number of words, in many cases having little relevance to one another, that all have the same stem and consequently get indexed together under the same stem. As a result, the document index is less precise. In contrast, the technique discussed in the previous paragraph, in conjunction with other aspects of this disclosure, is able to obtain improved results over this conventional technique, as it is able to utilize a more precise index database by indexing according to words as found in document, but it is able to identify the same breadth of documents as the conventional technique, while also facilitating an improved ranking of the identified documents.

Another technique for identifying an expanded term related to an original query term is the use of a thesaurus, in which expanded terms for a given term are associated with each other. For example, synonyms without any common stem, such as "cat" and "feline," may be associated in the thesaurus, such that a query including the original query term "cat" will be expanded to also include "feline." Thesaurus associations may be manually specified by a user or administrator, for example based on domain experience that certain terms are generally more effectively searched together. In an embodiment, thesaurus associations may be automatically generated based on document processing by indexing engine 166. For example, a frequent co-occurrence of two terms in documents may be used to determine that the terms are sufficiently related to be associated in the thesaurus. In an embodiment, the thesaurus associations may be generated based on automated analysis of queries submitted to search system 160. For example, the co-occurrence of terms in a single search or refined searches may be used to determine that the terms are sufficiently related to be associated in the thesaurus.

In step 440, for each identified expanded query term, query expansion engine 167 is further configured to determine a weight intended for use with ranking of search results. This weighting is determined based on a lexical distance between the original query term for which an expanded query term was identified and the expanded query term. A lexical distance indicates a distance between two words according to a particular technique. A smaller value indicates a greater degree of similarity between the two words. One trivial example is to calculate an absolute difference in the number of characters for each word. According to this example, the lexical distance between "carry" and "carrier" is 2. Other techniques include, but are not limited to, determining a lexical distance based on the Jaro distance or the Jaro-Winkler distance techniques (taking into account that the normalized scores these techniques produce range from 0 for no match to 1 for a perfect match).

In an embodiment, the lexical distance is determined by determining an "edit distance" between an original query term and a corresponding expanded query term. An edit distance is determined by calculating a minimum cost of performing edit operations, which typically perform single character edits, to convert a first word to a second word. Edit operations may include, but are not limited to, replacement, insertion, deletion, and transposition or characters or character sequences. In some cases, edit operations may have different costs, such as where insertions and deletions have the same cost, and replacements have twice the cost of an insertion. In some cases, edit operations may be performed on phonetic units of one or more characters, rather than just individual characters. In an embodiment, the Levenshtein distance, one of the more widely used edit distances, is used to determine the lexical distance between an original query term and a corresponding expanded query term. Algorithms for calculating the Levenshtein distance, including Hirschberg's algorithm and the Wagner-Fischer algorithm, are known in the art. Other edit distances are known in the art, including the Damerau-Levenshtein distance, Monge-Elkan distance, and Smith-Waterman distance.

In the event that the same expanded query term is identified for two original query terms, query expansion engine 167 may be configured to determine that the greater of the two respective weightings is the only weighting applied for the expanded query term.

In step 440, a weight, reflecting an expected degree of relevance of an expanded query term to a query, is determined based on the determined lexical distance. In an embodiment, the weight is determined according to a strictly decreasing function of lexical distance (under an assumption that increased lexical distance corresponds to decreased similarity between two terms). In an embodiment, the weight is determined based on the exponential function, typically written as $\exp(x)$ or $e^x$, in which a weight w for an expanded query term having a lexical distance d from a corresponding original query term is determined according to $w=\exp(-d)$, or an approximation thereof. For example, in which a stem-based expansion is performed, the Levenshtein distance is used, and an approximation of $w=\exp(-d)$ is used, for the original query term "tickets," the following expanded query terms and corresponding weights may be determined: ticket/0.37 and ticketing/0.05 (additionally, a weight of 1.00 might be associated with the original query term "tickets"). The weight, although based on a lexical distance, may also be based on additional factors.

In an embodiment, the determination of distance and weight are collapsed together, whereby a weight based on a lexical distance is obtained. For example, the Jaro-Winkler distance, which generates a score ranging from 0 for no match to 1 for a perfect match between two words, may be directly used for weighting of expanded query terms.

In an embodiment, after a lexical distance is determined for an expanded query term, query expansion engine 167 determines whether the determined distance is at or above a threshold value. If so, the expanded query term is deemed to be too far removed from the original term, and accordingly the expanded query term is not included as part of a subsequent identification of documents relevant to the query. In an embodiment, after a weight is determined for an expanded query term, query expansion engine 167 determines whether the determined distance is at or below a threshold value. If so, the expanded query term is deemed to be insufficiently relevant to the original term, and accordingly the expanded query term is not included as part of a subsequent identification of documents relevant to the query.

In step 450, the original query terms and expanded query terms identified by query expansion engine 167 are used by search engine 165 to identify documents in index database 161 which are relevant to the query from which the original query terms were identified. For example, search engine 165 might be configured to identify each document containing one or more of the original or expanded query terms. As a result, a plurality of documents are identified as relevant to the query, although not necessarily in an order reflecting their relevance to the query.

The weights generated for the expanded query terms are provided to ranking engine 168. These weights are used in step 460 by ranking engine 168 to rank the identified documents. In an embodiment, where a document is identified based on its inclusion of an expanded query term, the weight corresponding to the expanded query term is used for ranking the document. In a nonlimiting example, one may specify a weight or "boost factor" to the Lucene search engine for query terms using the carat symbol in a search query string. In determining the relevance of documents to a search query, the Lucene search engine will apply the weighting in addition to other ranking factors, such as the frequency at which query terms appear throughout the entire indexed corpus of documents.

This ranking is used in step 470 by search system 165 to generate reply 132b identifying the identified documents ordered according to the ranking. In an embodiment, documents at or below a particular degree or ranking may be determined to be insufficiently relevant to query 131b, and as a result not identified in reply 132b. In an embodiment, the identification of documents relevant to query 131a and their ranking may be combined, rather than successive steps.

In some embodiments, ranking engine 168 relies on other factors in addition to the above weighting based on lexical distance. For example, although the weighting based on lexical distance is associated with a respective query term, other weightings may be based on more document-specific considerations, such as, but not limited to, frequency of citation or access, or a score assigned to a creator or a provider of a given document. Other document features which may be used as ranking factors for a customer support ticket system include, but are not limited to ticket age, date of creation, last date of access, ticket status (for example, open or resolved), and number of comments. In an embodiment, query 131b may include information which causes ranking engine 168 to include, exclude, and/or adjust factors in determining document ranking. For example, query 131b may instruct search system to rank more administrator-generated documents more highly than user-generated documents.

In an embodiment, a weight is not calculated, and ranking by ranking engine 168 relies on a lexical distance for expanded query terms.

Although examples above describe determining distances and weights for expanded query terms before identifying documents relevant to a query, in an embodiment, these determinations can be made after search engine 165 identifies documents relevant to the query.

In an embodiment, recursive expansions may be performed with or without corresponding weightings. For example, query expansion engine 167 may identify a first expanded term using a thesaurus to find words associated with an original query term. As expansions identified from a thesaurus a more likely to have a greater lexical distance that does not correspond to their relevance to the original term, query expansion engine 167 may be configured not to associate a weighting based on lexical distance from the original query term with the first expanded term (although another weighting may be applied to the first expanded term to, for example, reduce the weight of the expanded term relative to the original term). Then, query expansion engine 167 may generate a second expanded term by identifying words that have a stem in common with the first expanded term, and according a weight to the second expanded term according to it lexical distance from the first expanded term. The weight for the second expanded term might be reduced relative a weight that would be determined were the second expanded term not a recursive expansion.

In another embodiment, a first expanded term may be generated by identifying words that have a stem in common with an original query term, and a second expanded term may be identified using a thesaurus to find words associated with an original query term. A first weighting may be determined for the first expanded term based on a lexical distance between the original query term and the first query term, and a second weighting may be determined for the second expanded term based on the first weighting. For example, if a weighting X were determined according to some method for the second expanded term, the weighting X might be multiplied by the first weighting to reflect the second expanded term being a recursive expansion and the relevance of the first expanded query term from which it was expanded to the original query term.

In an embodiment, query 131b may include information instructing search system 160 not to perform query expansion for some or all query terms included in query 131b. For example, user 110 might enter a search phrase with a query term enclosed in quotation marks or preceded with a plus sign, which has the result that the query term is not expanded. In an embodiment, query expansion engine 167 may be configured to identify terms that it will not attempt to identify expansions, for example by way of a "do not expand" list. In an embodiment, indexing engine 166 may index certain document data under various fields, such as document type, title, author, or date, enabling query 131b to specify query terms to be used in connection with certain fields. In an example, a fixed set of predetermined tags or labels may be defined, such as for a status field indicating whether a customer support ticket is new, open, pending, solved, or closed. In this example, a query term for the status field is not expanded.

Although examples are disclosed which involve calculation of various values, those skilled in the art understand that the disclosed calculations can be replaced with more direct calculations of values by use of techniques including, but not limited to, table lookup techniques. However, such techniques may be more computationally efficient, they are simply alternative calculations that remain within the scope of this disclosure.

Figure 2:
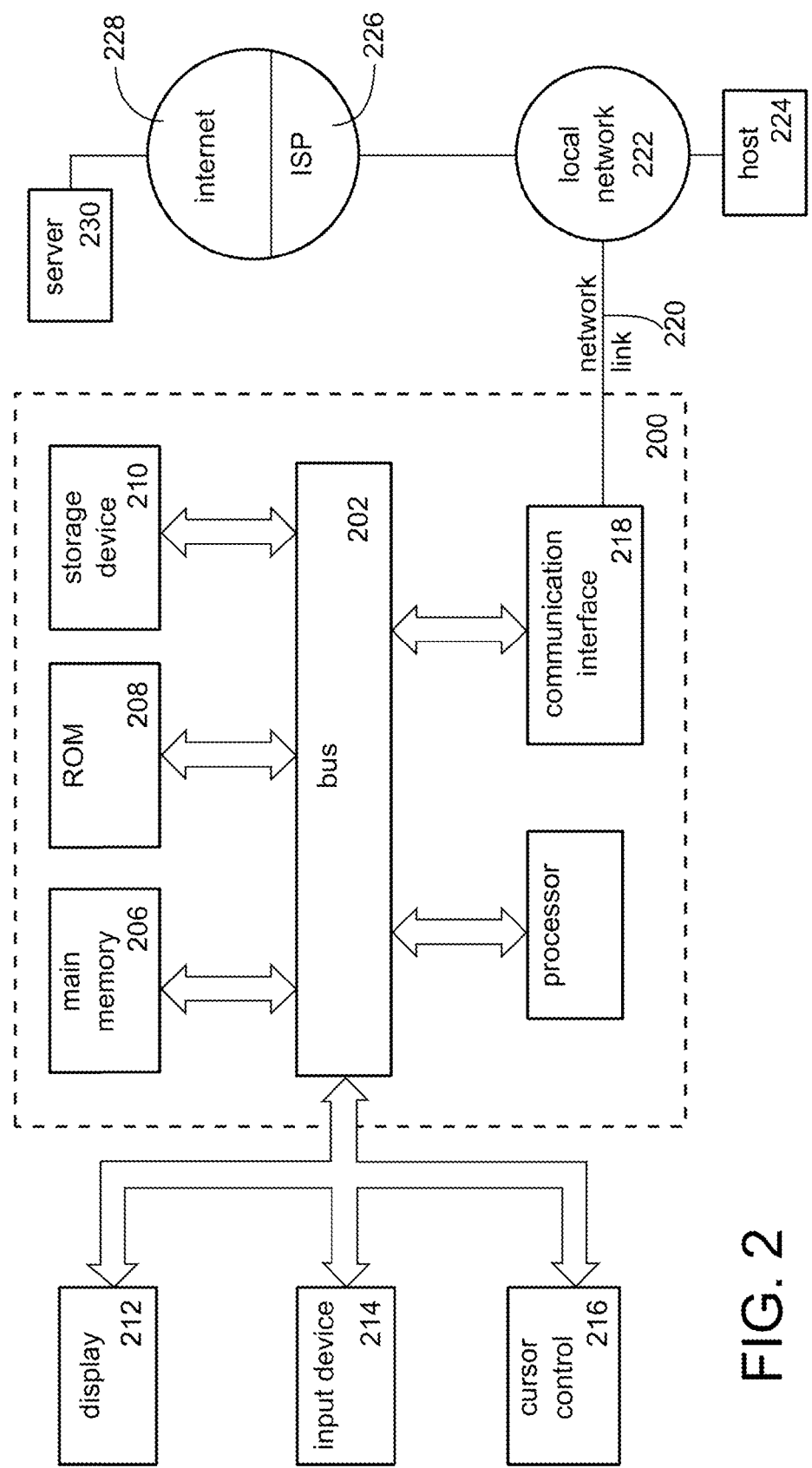
FIG. 2 is a block diagram illustrating a computer system on which aspects of the invention may be implemented.

FIG. 2 is a block diagram that illustrates a computer system 200 upon which aspects of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   receiving a search query;
   identifying a first original query term based on the query;
   identifying a first expanded query term related to the first original query term;
   determining a first lexical distance between the first original query term and the first expanded query term;
   determining a first weight for the first expanded query term based on the determined first lexical distance;
   identifying a plurality of documents, from among a corpus of documents, as each relevant to the search query, the plurality of documents including a first document identified based on an inclusion of the first expanded query term;
   ranking the plurality of documents, with the ranking of the first document being based upon the calculated first weight; and
   generating a response to the search query identifying two or more of the plurality of documents, ordered according to the ranking.

2. The method of claim 1, further comprising:
   identifying a second expanded query term related to the first original query term;
   determining a second lexical distance between the first original query term and the second expanded query term;
   determining a second weight for the second expanded query term based on the determined second lexical distance; and
   identifying a second document from among the corpus of documents based on an inclusion of the second expanded query term, the second document being included in the plurality of documents,
   wherein the ranking of the second document is based upon the calculated second weight.

3. The method of claim 1, wherein the determining the first lexical distance comprises determining an edit distance between the first original query term and the first expanded query term.

4. The method of claim 3, wherein the determining the edit distance comprises determining a Levenshtein distance between the first original query term and the first expanded query term.

5. The method of claim 1, wherein the first weight is determined according to a function approximately equal to exp(−d), where d corresponds to the lexical distance.

6. The method of claim 1, wherein the identifying the first expanded query term comprises identifying a word based on the word having a stem in common with the first original query term key.

7. The method of claim 6, wherein the identifying the word comprises:
   determining a stem for the first original query term; and
   retrieving the word from an index or table by utilizing the determined stem as a key.

8. The method of claim 1, further comprising:
   identifying a second expanded query term related to the first original query term;
   determining a second lexical distance between the first original query term and the second expanded query term;
   determining a second weight for the second expanded query term based on the calculated second lexical distance, where the second weight is determined in accordance with the first strictly decreasing function of lexical distance; and
   determining not to utilize the second expanded query term for the identifying the plurality of documents as a result of the second weight being at or below a threshold value.

9. The method of claim 1, further comprising:
   identifying a second expanded query term related to the first original query term;

determining a second lexical distance between the first original query term and the second expanded query term; and determining not to utilize the second expanded query term for the identifying the plurality of documents as a result of the second lexical distance being at or above a threshold value.

10. The method of claim 1, wherein the plurality of documents are support tickets for a customer support system.

11. The method of claim 1, further comprising:
identifying a second expanded query term related to the first original query term;
identifying a third expanded query term based on the third expanded query term having a stem in common with the second expanded query term;
determining a second lexical distance between the second expanded query term and the third expanded query term;
determining a second weight for the third expanded query term based on the determined second lexical distance; and
identifying a second document from among the corpus of documents based on an inclusion of the third expanded query term, the second document being included in the plurality of documents,
wherein the ranking of the second document is based upon the calculated second weight.

12. The method of claim 11, wherein the identifying the second expanded query term comprises selecting the second expanded query term from a thesaurus which identifies the second expanded query term as related to the first original query term.

13. A search system comprising:
a query expansion engine programmed to
receive a search query;
identify a first original query term based on the query;
identify a first expanded query term related to the first original query term;
determine a first lexical distance between the first original query term and the first expanded query term; and
determine a first weight for the first expanded query term based on the determined first lexical distance;
a search system programmed to identify a plurality of documents, from among a corpus of documents, as each relevant to the search query, the plurality of documents including a first document identified based on an inclusion of the first expanded query term; and
a ranking engine programmed to rank the plurality of documents, with the ranking of the first document being based upon the calculated first weight,
wherein the search system is further programmed to generate a response to the search query identifying two or more of the plurality of documents, ordered according to the ranking.

14. The search system of claim 13, wherein
the query expansion engine is further programmed to identify a second expanded query term related to the first original query term;
determine a second lexical distance between the first original query term and the second expanded query term; and
determine a second weight for the second expanded query term based on the determined second lexical distance; and
the search system is further programmed to identify a second document from among the corpus of documents based on an inclusion of the second expanded query term, the second document being included in the plurality of documents,
wherein the ranking of the second document is based upon the calculated second weight.

15. The search system of claim 13, wherein the programming for the query expansion engine to determine the first lexical distance includes instructions which determine an edit distance between the first original query term and the first expanded query term.

16. The search system of claim 15, wherein the programming for the query expansion engine to determine the edit distance comprises instructions which determine a Levenshtein distance between the first original query term and the first expanded query term.

17. The search system of claim 13, wherein the first weight is determined according to a function approximately equal to $\exp(-d)$, where d corresponds to the lexical distance.

18. The search system of claim 13, wherein the programming for the query expansion engine to identify the first expanded query term comprises instructions which identify a word based on the word having a stem in common with the first original query term.

19. The search system of claim 18, wherein the instructions which identify the word comprise: instructions to determine a stem for the first original query term; and instructions to retrieve the word from an index or table by utilizing the determined stem as a key.

20. The search system of claim 13, wherein
the query engine is further programmed to identify a second expanded query term related to the first original query term;
determine a second lexical distance between the first original query term and the second expanded query term; and
determine a second weight for the second expanded query term based on the calculated second lexical distance, where the second weight is determined in accordance with the first strictly decreasing function of lexical distance,
wherein the second expanded query term is not used to identify the plurality of documents as a result of the second weight being at or below a threshold value.

* * * * *